US012025552B1

(12) United States Patent
Wang et al.

(10) Patent No.: US 12,025,552 B1
(45) Date of Patent: Jul. 2, 2024

(54) QUALITY DETECTION METHOD FOR POROUS METAL MATERIAL

(71) Applicant: Hangzhou Dianzi University, Hangzhou (CN)

(72) Inventors: Chuanyong Wang, Hangzhou (CN); Yating Wan, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 18/473,219

(22) Filed: Sep. 23, 2023

(30) Foreign Application Priority Data

Feb. 24, 2023 (CN) .......................... 202310158773.1

(51) Int. Cl.
G01N 21/17 (2006.01)
G01N 21/88 (2006.01)
G01N 21/956 (2006.01)

(52) U.S. Cl.
CPC ......... *G01N 21/17* (2013.01); *G01N 21/8851* (2013.01); *G01N 2021/1765* (2013.01); *G01N 2021/8887* (2013.01); *G01N 21/956* (2013.01)

(58) Field of Classification Search
CPC .. G01N 21/17; G01N 21/8851; G01N 21/956; G01N 2021/1765; G01N 2021/8887
USPC ...................... 356/237.1–237.6, 239.1–239.8
See application file for complete search history.

(56) References Cited

FOREIGN PATENT DOCUMENTS

JP     2022147365 A  * 10/2022

OTHER PUBLICATIONS

CNIPA, Notification of First Office Action for CN202310158773.1, Apr. 6, 2023.
Hangzhou Dianzi University (Applicant), Reply to Notification of First Office Action for CN202310158773.1, w/ (allowed) replacement claims, Apr. 11, 2023.
CNIPA, Notification to grant patent right for invention in CN202310158773.1, Apr. 15, 2023.

* cited by examiner

*Primary Examiner* — Tri T Ton
(74) *Attorney, Agent, or Firm* — Zhigang Ma (57) ABSTRACT

A quality detection method for porous metal material is provided, and the method includes: acquiring a sectional image of a porous metal material, converting the sectional image to a grayscale image; obtaining a shadow region of each of pore regions and a correction weight value of the shadow region to determine a first qualification index; acquiring an optimal preset clustering K value, and determining a pore diameter distribution uniformity index, and determining a second qualification index based on the pore diameter distribution uniformity index; determining a quality evaluation index of the porous metal material based on the first qualification index and the second qualification index; and determining whether quality of the porous metal material is qualified based on the quality evaluation index. The method realizes the quality detection of the porous metal material and effectively improves the accuracy of the quality detection result of the porous metal material.

8 Claims, 3 Drawing Sheets

QUALITY DETECTION METHOD FOR POROUS METAL MATERIAL

TECHNICAL FIELD

The disclosure relates to the field of image processing technology, in particular to a quality detection method for porous metal material.

BACKGROUND

Porous materials have been widely used in many fields, such as petrochemical industry, medical textiles, construction engineering and metallurgy manufacturing. The porous materials have the characteristics of low density, well-developed pore distribution and small pores, and have a stable structure. Especially, closed-cell porous metal materials in the porous materials are important metal materials and play an irreplaceable role in the field of material science. However, when solid foaming or gas foaming methods are used to produce porous metal materials, process parameters may be inaccurate in the production process of the porous metal materials due to the influence of production technology, and the inaccurate process parameters result in quality defects including uneven pore sizes and pore distribution of the porous metal materials. In order to reduce the effect on a subsequent product made of the porous metal materials, it is necessary to detect and analyze the severity of quality defects of the porous metal materials.

At present, a traditional method for detecting quality defects of the porous metal materials is generally a manual visual method which needs the condition of sufficient light. The manual visual method has low efficiency, poor accuracy, high cost, and relies heavily on the prior knowledge of a detection personnel, and is difficult to realize intelligent production of the porous metal materials. In order to solve the disadvantages of the manual visual method, a defect detection method based on a classifier is proposed. In the defect detection method, the classifier is trained by collecting a large amount of image data to obtain a feature vector of each region in images, and the feature vector is compared with a sample feature vector to output a final comparison result. The defect detection method base on the classifier needs a lot of training data when the classifier is trained, which costs a lot of time for detecting. In addition, sample feature vectors corresponding to different porous metal materials are different, so that the robustness is poor when the defect detection is realized by comparing the sample feature vectors; and selected sample feature vectors are not completely standard, so that the accuracy of the quality detection of the porous metal materials is low.

SUMMARY

In order to solve the low accuracy of the quality detection of the porous metal materials, a purpose of the disclosure is to provide a quality detection method for porous metal material.

The quality detection method for porous metal material provided by the disclosure includes:
  step 1: acquiring a sectional image of a porous metal material, and performing pre-processing on the sectional image to obtain a grayscale image;
  step 2: obtaining pore regions of a section of the porous metal material based on the grayscale image, and obtaining a shadow region of each of the pore regions based on the pore regions;
  step 3: acquiring a light source region of the porous metal material, and determining a correction weight value of the shadow region of each of the pore regions based on a central position of each of the pore regions, a central position of the light source region, and a preset correction weight value of a light source distance;
  step 4: clustering the pore regions of the section of the porous metal material to obtain first clusters; determining a first qualification index of the porous metal material based on the number of the first clusters, the number of pore regions in each of the first clusters, a correction weight value of a shadow region of each of the pore regions in each of the first clusters, and an area of the shadow region of each of the pore regions in each of the first clusters; and the area of the shadow region being the number of all pixel points in the shadow region;
  step 5: acquiring an optimal preset clustering K value, obtaining second clusters based on the optimal preset clustering K value and a pore diameter of each of the pore regions of the section of the porous metal material, and determining a pore diameter distribution uniformity index of each of the second clusters based on the number of pore diameters in each of the second clusters, a central position of each of the pore diameters in each of the second clusters, and a central position of the grayscale image;
  step 6: determining a second qualification index of the porous metal material based on the pore diameter distribution uniformity index of each of the second clusters, and determining a quality evaluation index of the porous metal material based on the first qualification index and the second qualification index; and
  step 7: determining whether the porous metal material is qualified based on the quality evaluation index.

In an embodiment, a calculation formula for the first qualification index is expressed as:

$$Q = \exp\left(-\sum_{r=1}^{N} \frac{\sum_{i=1}^{m-1} |\omega_i * s_i - \omega_{i+1} * s_{i+1}|}{m-1}\right)$$

where Q represents the first qualification index of the porous metal material, N represents the number of the first clusters, r represents a sequence number of the first cluster, m represents the number of the pore regions in each of the first clusters, i represents a sequence number of the pore regions in each of the first clusters, $\omega_i$ represents a correction weight value of a shadow region of an i-th pore region in each of the first clusters, $s_i$ represents an area of the shadow region of the i-th pore region in each of the first clusters, $\omega_{i+1}$ represents a correction weight value of a shadow region of an i+1-th pore region in each of the first clusters, $s_{i+1}$ represents an area of the shadow region of the i+1-th pore region in each of the first clusters, exp( ) represents an exponential function based on a natural constant, and | | represents an absolute value function.

In an embodiment, in the step 5, the acquiring an optimal preset clustering K value includes:
  using an initial preset clustering K value to cluster the pore diameter of each of the pore regions of the section of the porous metal material, thereby obtaining initial first clusters; determining an intra-cluster effect evaluation value and an inter-cluster effect evaluation value corresponding to the initial preset clustering K value based on a central position of a pore diameter of each pore region in each of the initial first clusters and a central position of each of the initial first clusters; and determining a clustering effect evaluation index corresponding to the initial preset clustering K value based on the intra-cluster effect evaluation value and the inter-cluster effect evaluation value;

when the clustering effect evaluation index corresponding to the initial preset clustering K value is not greater than a clustering effect threshold, updating the initial preset clustering K value to obtain an updated preset clustering K value and a clustering effect evaluation index corresponding to the updated preset clustering K value; when the clustering effect evaluation index corresponding to the updated preset clustering K value is still not greater than the clustering effect threshold, repeatedly updating the updated preset clustering K value to obtain a subsequent preset clustering K value and a clustering effect evaluation index corresponding to the subsequent preset clustering K value until the clustering effect evaluation index corresponding to the subsequent preset clustering K value is greater than the clustering effect threshold; and taking the subsequent preset clustering K value greater than the clustering effect threshold as the optimal preset clustering K value.

In an embodiment, in the step 2, the obtaining pore regions of a section of the porous metal material based on the grayscale image includes:

performing edge detection on the grayscale image to obtain an edge image, processing the edge image by using a Hough gradient method to obtain circular edges in the edge image, and taking a region within each of the circular edges as each of the pore regions in the section of the porous metal material.

In an embodiment, in the step 2, the obtaining a shadow region of each of the pore regions based on the pore regions includes:

performing edge detection on each of the pore regions to obtain a shadow edge line of each of the pore regions, calculating average gray values corresponding to two regions divided by the shadow edge line, and using one of the two regions with a smaller average gray value as the shadow region of the pore region.

In an embodiment, in the step 3, the determining a correction weight value of the shadow region of each of the pore regions based on a central position of each of the pore regions, a central position of the light source region, and a preset correction weight value of a light source distance includes:

determining a Euclidean distance between the pore region and the light source region based on the central position of the pore region and the central position of the light source region, and using the Euclidean distance as the light source distance between the pore region and the light source region; and determining the correction weight value of the shadow region based on the preset correction weight value of the light source distance and the light source distance between the pore region and the light source region, and a calculation formula for the correction weight value of the shadow region being expressed as follows:

$\omega = p * \exp(-d)$ where $\omega$ represents the correction weight value of the shadow region, p represents the preset correction weight value of the light source distance, d represents the light source between the pore region and the light source distance, and exp( ) represents an exponential function based on a natural constant.

In an embodiment, in the step 5, the determining a pore diameter distribution uniformity index of each of the second clusters based on the number of pore diameters in each of the second clusters, a central position of each of the pore diameters in each of the second clusters, and a central position of the grayscale image includes:

determining a Euclidean distance between a center of each pore diameter in each of the second clusters and a center of the grayscale image based on the central position of each of the pore diameters in each of the second clusters and the central position of the grayscale image; and determining an average Euclidean distance of each of the second clusters based on the number of pore diameters in each of the second clusters and the Euclidean distance between the center of each pore diameter in each of the second clusters and the center of the grayscale image; and taking the average Euclidean distance as the pore diameter distribution uniformity index of a corresponding one of the second clusters.

In an embodiment, in the step 6, the determining a second qualification index of the porous metal material based on the pore diameter distribution uniformity index of each of the second clusters includes:

calculating an absolute value of a difference value between pore diameter distribution uniformity indexes corresponding to any two second clusters based on the pore diameter distribution uniformity index of each of the second clusters;

determining the second qualification index of the porous metal material based on the absolute value of the difference value between the pore diameter distribution uniformity indexes corresponding to any two second clusters, and a calculation formula for the second qualification index being expressed as follows $$e = \exp\left(-\sum_{l=1}^{K}\sum_{j=1}^{K}|f_l - f_j|\right)$$

where e represents the second qualification index of the porous metal material, exp( ) represents an exponential function based on a natural constant, K represents the number of the second clusters, l and j are both sequence numbers of the second clusters, $f_l$ represents a pore diameter distribution uniformity index corresponding to a l-th second cluster, $f_j$ represents a pore diameter distribution uniformity index corresponding to a j-th second cluster, and | | represents an absolute value function.

In an embodiment, in the step 6, the determining a quality evaluation index of the porous metal material based on the first qualification index and the second qualification index includes: calculating a product of the first qualification index and the second qualification index, and taking the product as the quality evaluation index of the porous metal material.

In an embodiment, in the step 7, the determining whether the porous metal material is qualified based on the quality evaluation index includes:

determining that the porous metal material is unqualified when the quality evaluation index is less than a preset quality evaluation threshold; and determining that the porous metal material is qualified when the quality evaluation index is not less than the preset quality evaluation threshold.

The disclosure has following beneficial effects.

The disclosure provides a quality detection method for porous metal material, the quality detection method uses an image processing technology to preprocess the sectional image of the porous metal material. The image preprocessing helps to analyze image feature information of the sectional image and reduce the influence of external factors on a quality detection result of the porous metal material. Based on pore regions, a shadow region of each of the pore regions is analyzed to obtain a first qualification index of the porous metal material, and the first qualification index indicates uniformity of pore size. Compared with the manual visual method, the disclosure can obtain the quantitative index corresponding to the uniformity of pore size, which is conducive to improving the accuracy of the quality detection result of the porous metal material. In order to obtain a more accurate area of the shadow region, a correction weight value of the shadow region is determined based on a central position of the pore region, a central position of the light source region, and a preset correction weight value of a light source distance, which can overcome the influence of different light source distances on the area of the shadow region in a certain degree, improve the accuracy of the area of the shadow region, and further improve the accuracy of the first qualification index of the porous metal material. In order to obtain a more suitable pore diameter distribution uniformity index, an optimal preset clustering K value is selected from multiple preset clustering K value to ensure that the pore diameter distribution uniformity index is obtained based on the optimal preset clustering K value, which improves accuracy of a second qualification index of the porous metal material obtained by calculating the pore diameter distribution uniformity index and realizes an accurate analysis of the distribution uniformity of pores in the porous metal material. Based on the first qualification index and the second qualification index of the porous metal material, a quality evaluation index of the porous metal material is obtained, and the quality evaluation index is used to determine whether the porous metal material is qualified. The quality of the porous metal material is analyzed from two aspects, which is beneficial for improving the comprehensiveness and accuracy of the quality detection result of the porous metal material.

BRIEF DESCRIPTION OF DRAWINGS

In order to clearly illustrate technical solutions and advantages of embodiments of the disclosure or the prior art, the following is a brief introduction to the drawings used in the description of the embodiments or the prior art. Apparently, the drawings in the following description are only some embodiments of the disclosure. For those of ordinary skill in the art, other drawings may also be obtained from these drawings.

DETAILED DESCRIPTION OF EMBODIMENTS

In order to further illustrate technical means of the disclosure used to achieve an intended purpose and effects of the technical means, the following is a detailed description of specific embodiments, structures, features and effects of technical solutions proposed by the disclosure in conjunction with the drawings and exemplary embodiments. In the following description, "one embodiment" or "another embodiment" may not refer to the same embodiment. Furthermore, particular features, structures, or characteristics of one or more embodiments may be combined in any suitable manner.

Unless otherwise defined, all technical and scientific terms used in the disclosure have the same meanings as those commonly understood by those skilled in the art.

Figure 1:
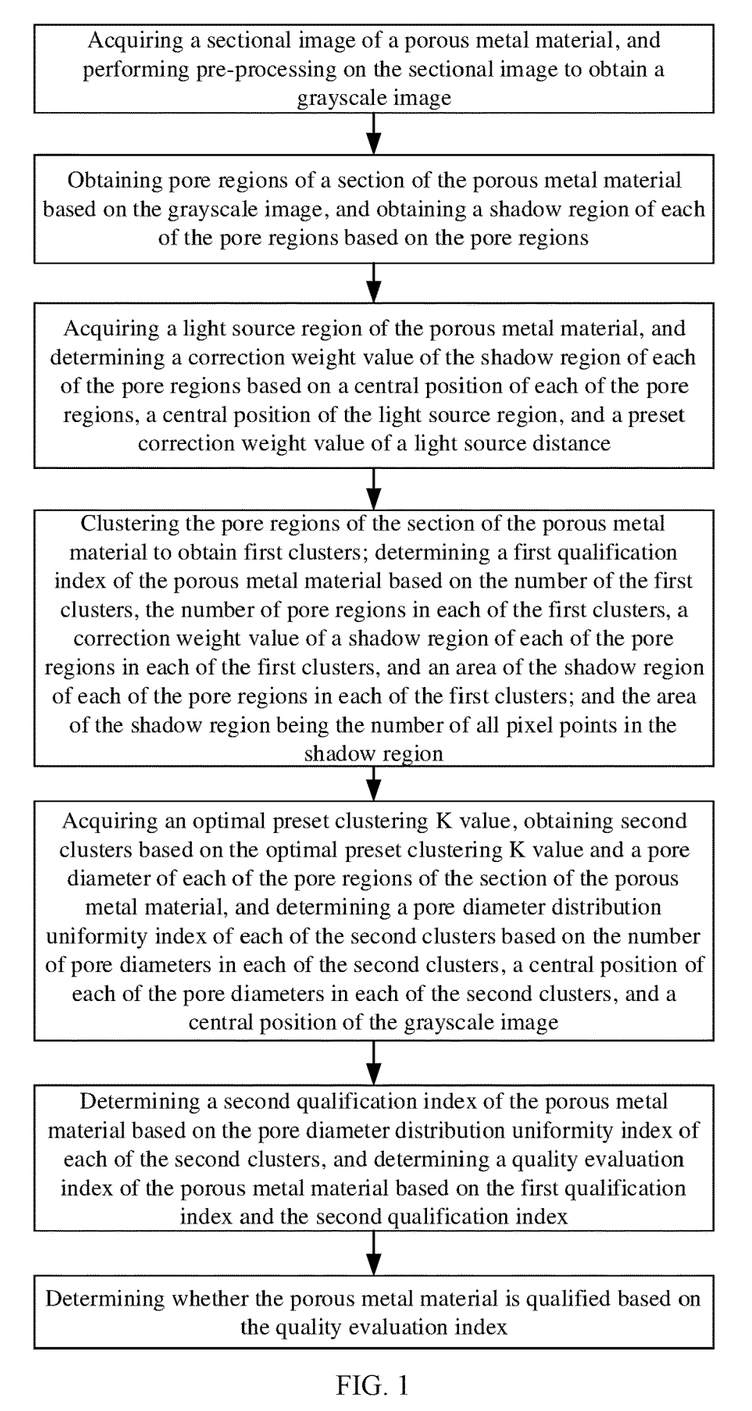
FIG. 1 illustrates a flowchart of a quality detection method for porous metal material.

An application scenario of this embodiment can be used for quality detection of closed-cell porous metal materials. In order to achieve accurate quality detection of the porous metal materials, the disclosure provides a quality detection method of porous metal materials as shown in FIG. 1, and the quality detection method includes following steps.

Step 1: acquiring a sectional image of a porous metal material, and performing pre-processing on the sectional image to obtain a grayscale image.

Figure 2:
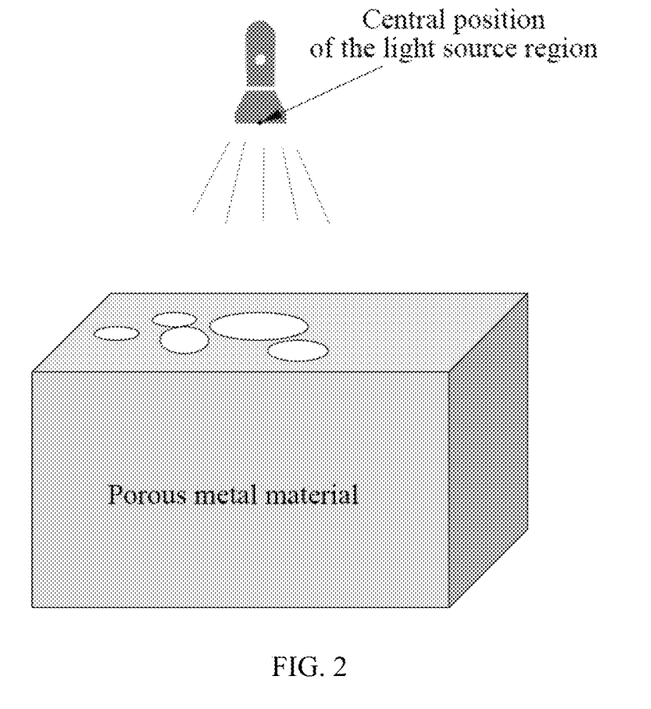
FIG. 2 illustrates a diagram of a porous metal material and a light source.
Figure 3:
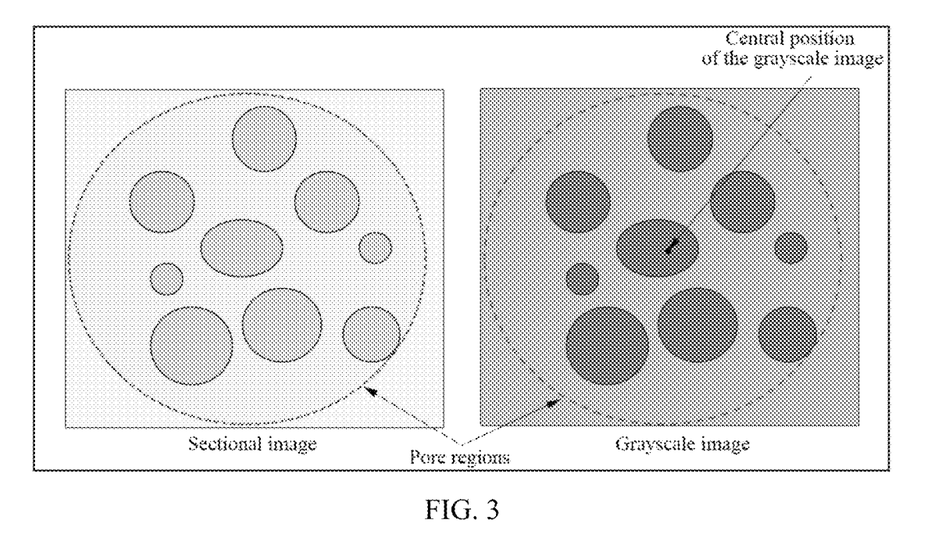
FIG. 3 illustrates a diagram of a sectional image and a grayscale image.

Specifically, in the embodiment, a sample of the closed-cell porous metal material is selected is taken as the porous metal material. The porous metal material is cut and placed on a conveyor belt. An industrial microscope camera is disposed above the conveyor belt, the industrial microscope camera is used to capture a sectional image (as shown in FIG. 3) of the porous metal material as shown in FIG. 2, and the sectional image of the porous metal material is collected. It is worth noting that when taking photos of a section of the porous metal material, in order to better extract information from the image, the embodiment uses a single light source for taking photos.

In order to facilitate the subsequent extraction of more accurate image information, the section image of the porous metal material is subjected to image preprocessing, and a Gaussian filtering algorithm is used to denoise the sectional image to obtain a preprocessed sectional image. The image preprocessing includes but is not limited to denoising. A realization process of the Gaussian filtering algorithm belongs to prior art and is not within a protection scope of the disclosure, and the realization process will not be further described here. In addition, in order to facilitate a subsequent analysis of the image information of the sectional image, a weighted average grayscale algorithm is used to grayscale the preprocessed sectional image to obtain the grayscale image, as shown in FIG. 3. The implementation algorithm for grayscale includes but is not limited to the weighted average grayscale algorithm, which is not specifically limited here. The implementation process of the weighted average grayscale algorithm is based on the prior art, and will not be described in detail here.

Figure 4:
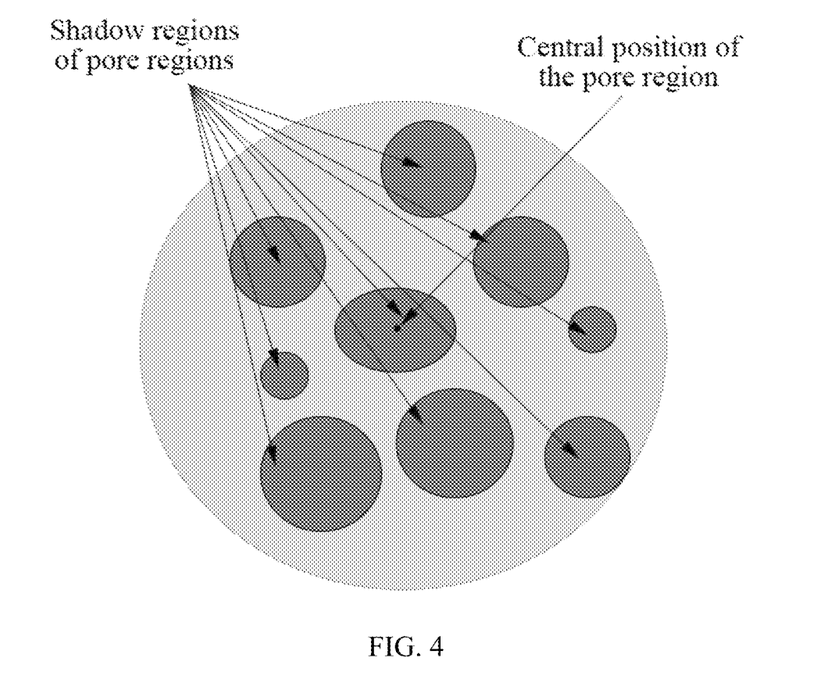
FIG. 4 illustrates a diagram of central positions and shadow regions of pore regions of the grayscale image.

Step 2: obtaining pore regions of a section of the porous metal material based on the grayscale image, and obtaining a shadow region (as shown in FIG. 4) of each of the pore regions based on the pore regions.

Specifically, the step 2 includes step 2.1 and step 2.2.

Step 2.1: obtaining pore regions of a section of the porous metal material based on the grayscale image.

Specifically, the obtaining pore regions of a section of the porous metal material based on the grayscale image includes:

performing edge detection on the grayscale image to obtain an edge image, processing the edge image by using a Hough gradient method to obtain circular edges in the edge image, and taking a region within each of the circular edges as each of the pore regions in the section of the porous metal material.

In the embodiment, a Canny edge detection operator is used for carrying out edge detection on the grayscale image to obtain an edge image corresponding to the grayscale image, and then each circular edge in the edge image is extracted by using a Hough gradient method; and as a shape of each pore in the section of the porous metal material is circular, a region within each circular edge can be used as each pore region of the section of the porous metal material. The implementation processes of the Canny edge detection operator and the Hough gradient method belong to the prior art and are not within the scope of the disclosure, and will not be described in detail here.

Step 2.2: obtaining a shadow region of each of the pore regions based on the pore regions.

Specifically, the obtaining a shadow region of each of the pore regions based on the pore regions includes: performing edge detection on each of the pore regions to obtain a shadow edge line of each of the pore regions, calculating average gray values corresponding to two regions divided by the shadow edge line, and using one of the two regions with a smaller average gray value as the shadow region of the pore region.

In the embodiment, it can be known that the shadow region of the pore region can be presented in the pore region based on the image characteristics of each pore of the porous metal material in the grayscale image. As the gray value of pixel points in the shadow region is lower than that of pixel points in other regions, the Canny edge detection operator can be used for carrying out the edge detection on each pore region. The shadow edge line can divide the pore region into two regions. Based on the gray value of each pixel point in the two regions, an average gray value corresponding to each of the two regions, and a region of the two regions with a smaller average gray value is taken as a shadow region corresponding to the pore region.

Based on the above steps, the embodiment has obtained the shadow region of each pore region in the section of the porous metal material as shown in FIG. 4, which is beneficial for improving the accuracy of the quality detection result of the porous metal material.

Step 3: acquiring a light source region of the porous metal material, and determining a correction weight value of the shadow region of each of the pore regions based on a central position of each of the pore regions, a central position of the light source region (as shown in FIG. 2), and a preset correction weight value of a light source distance.

Specifically, in order to obtain a more accurate area of the shadow region, a correction weight value of the shadow region is determined based on central positions of the pore region and the light source region and a preset correction weight value of a light source distance, which can overcome the influence of different light source distances on the area of the shadow region in a certain degree, thereby improving the accuracy of the area of the shadow region.

In the embodiment, the single light source set in the step 1 can be a light emitting diode (LED). A region image of the LED is used as the light source region of the porous metal material. Furthermore, the step 3 includes step 3.1 and step 3.2.

Step 3.1: determining a Euclidean distance between the pore region and the light source region based on the central position of the pore region and the central position of the light source region, and using the Euclidean distance as the light source distance between the pore region and the light source region.

In the embodiment, the Euclidean distance between a center of the pore region and a center of the light source region is calculated based on a coordinate position of the center of the pore region and a coordinate position of the center of the light source region. A process of calculating the Euclidean distance is based on the prior art and will not be described here. The Euclidean distance is taken as the light source distance between the pore region and the light source region.

Step 3.2: determining the correction weight value of the shadow region based on the preset correction weight value of the light source distance and the light source distance between the pore region and the light source region.

In the embodiment, shadow regions of pore regions with the same pore diameter are subject to the influence of the light source distance, and areas of the shadow regions are greatly different. In order to avoid the influence of the light source distance, the correction weight value of the shadow region is determined based on the light source distance between the pore region and the light source region, and a calculation formula for the correction weight value of the shadow region is expressed as follows:

$$\omega = p^* \exp(-d)$$

where $\omega$ represents the correction weight value of the shadow region, p represents the preset correction weight value of the light source distance, d represents the light source between the pore region and the light source distance, and exp( ) represents an exponential function based on a natural constant.

In the calculation formula for the correction weight value of the shadow region, the preset correction weight value of the light source distance may be set to 0.7, the implementer can set the preset correction weight value of the light source distance based on a specific situation of the light source of the porous metal material, without specific limitations here. Based on the existing knowledge of light source distance, it is known that the light source distance d between the pore region and the light source region is negatively correlated with the correction weight value $\omega$ of the shadow region. When the light source distance d between the pore region and the light source region is smaller, the correction weight value $\omega$ of the shadow region of the pore region is larger; otherwise, the correction weight value w of the shadow region of the pore region is smaller.

Step 4: clustering the pore regions of the section of the porous metal material to obtain first clusters; determining a first qualification index of the porous metal material based on the number of the first clusters, the number of pore regions in each of the first clusters, a correction weight value of a shadow region of each of the pore regions in each of the first clusters, and an area of the shadow region of each of the pore regions in each of the first clusters.

Specifically, the step 4 includes step 4.1 and step 4.2.

Step 4.1: clustering the pore regions of the section of the porous metal material to obtain first clusters.

In the embodiment, the Density-Based Based Spatial Clustering of Applications with Node (DBSCAN) algorithm is used to cluster the pore regions of the porous metal material to obtain pore region clusters. The pore region clusters are taken as the first clusters, the number of the first clusters is determined based on an area of the section of the porous metal material and a distribution situation of the pore regions, and the number of the first clusters is expressed as N in a formula.

It should be noted that two parameters of the DBSCAN algorithm, the neighborhood radius Epsilon may be 3, and the minimum neighbor minpts of the core point may also be 3. In addition, an implementation process of the DBSCAN algorithm belongs to prior art and is not within the scope of protection of the disclosure, and will not be described here.

Step 4.2: determining a first qualification index of the porous metal material based on the number of the first clusters, the number of pore regions in each of the first clusters, a correction weight value of a shadow region of each of the pore regions in each of the first clusters, and an area of the shadow region of each of the pore regions in each of the first clusters.

Firstly, based on the structural characteristics of the porous metal material, it is known that there can be multiple pores on the section of the porous metal material. Closed pores generated by bubbles with the same size on the cross-section of the same porous metal material should be the same, and a shadow region of each of the closed pores should also be similar. However, the depth and size of pores are difficult to represent in the grayscale image. In order to facilitate a subsequent calculation of a quality evaluation index of the porous metal material, the uniformity of all pore sizes of the porous metal material is analyzed based on the shadow region of each pore region.

In the embodiment, the first qualification index of the porous metal material is calculated based on the number of the first clusters, the number of all pore regions in each of the first clusters, the correction weight value of the shadow region of each of the pore regions in each of the first clusters, and the area of the shadow region of each of the pore regions in each of the first clusters. The area of the shadow region may be the number of all pixel points in the shadow region. The first qualification index indicates the uniformity of all pore sizes of the porous metal material. A calculation formula for the first qualification index is expressed as:

$$Q = \exp\left(-\sum_{r=1}^{N} \frac{\sum_{i=1}^{m-1} |\omega_i * s_i - \omega_{i+1} * s_{i+1}|}{m-1}\right)$$

where (represents the first qualification index of the porous metal material, N represents the number of the first clusters, r represents a sequence number of the first cluster, m represents the number of pore regions in each of the first clusters, i represents a sequence number of the pore regions in each of the first clusters, $\omega_i$ represents a correction weight value of a shadow region of an i-th pore region in each of the first clusters, $s_i$ represents an area of the shadow region of the i-th pore region in each of the first clusters, $\omega_{i+1}$ represents a correction weight value of a shadow region of an i+1-th pore region in each of the first clusters, $s_{i+1}$ represents an area of the shadow region of the i+1-th pore region in each of the first clusters, exp( ) represents an exponential function based on a natural constant, and | | represents an absolute value function.

In the calculation formula for the qualification index, $\omega_i * s_i$ and $\omega_{i+1} * s_{i+1}$ represent corrected areas corresponding to shadow regions of two adjacent pore regions in each of first clusters.

$$\frac{\sum_{i=1}^{m-1} |\omega_i * s_i - \omega_{i+1} * s_{i+1}|}{m-1}$$

in the calculation formula for the first qualification index represents a degree of difference in shadow regions corresponding to adjacent pore regions, and the degree of difference is negatively correlated with the first qualification index of the porous metal material. When the degree of difference is smaller, a size difference in adjacent pore regions is smaller, and the first qualification index of the porous metal material is larger.

Step 5: acquiring an optimal preset clustering K value, obtaining second clusters based on the optimal preset clustering K value and a pore diameter of each of the pore regions of the section of the porous metal material, and determining a pore diameter distribution uniformity index of each of the second clusters based on the number of pore diameters in each of the second clusters, a central position of each of the pore diameters in each of the second clusters, and a central position of the grayscale image.

Specifically, the step 5 includes step 5.1, step 5.2, and step 5.3.

Step 5.1: acquiring an optimal preset clustering K value.

It should be noted that, based on the prior knowledge of the structure of the porous metal material, when the porous metal material is qualified, the distribution of the pore regions on the section of the porous material should be uniform, and the pore sizes should be similar. Under a condition that the clustering effect is good, the pore diameter distribution uniformity index corresponding to each of second clusters should be relatively similar, and thus it is necessary to determine an optimal preset cluster K value for a subsequent analysis of the distribution uniformity of pore regions in each of the second clusters. Furthermore, the step 5.1 includes step 5.1.1, step 5.1.2, and step 5.1.3.

Step 5.1.1: using an initial preset clustering K value to cluster the pore diameter of each of the pore regions of the section of the porous metal material, thereby obtaining initial first clusters; determining an intra-cluster effect evaluation value and an inter-cluster effect evaluation value corresponding to the initial preset clustering K value based on a central position of a pore diameter of each pore region in each of the initial first clusters and a central position of each of the initial first clusters; and determining a clustering effect evaluation index corresponding to the initial preset clustering K value based on the intra-cluster effect evaluation value and the inter-cluster effect evaluation value.

Specifically, the step 5.1.1 includes step 5.1.1.1, step 5.1.1.2, and step 5.1.1.3.

Step 5.1.1.1: using an initial preset clustering K value to cluster the pore diameter of each of the pore regions of the section of the porous metal material, thereby obtaining initial first clusters.

In the embodiment, the initial preset clustering K value may be 1. The K-means clustering algorithm is used to perform a clustering analysis on the pore diameter of each of the pore regions of the section of the porous metal material, thereby obtaining multiple first pore diameter clusters, and the multiple first pore diameter clusters are used as the initial first clusters. An implementation process of the K-means clustering algorithm belongs to the prior art and is not within the protection scope of the disclosure, and it will not be described in detail here.

Step 5.1.1.2: determining an intra-cluster effect evaluation value and an inter-cluster effect evaluation value corresponding to the initial preset clustering K value based on a central position of a pore diameter of each pore region in each of the initial first clusters and a central position of each of the initial first clusters.

In order to facilitate calculating the clustering effect evaluation index corresponding to the initial preset clustering K value, the intra-cluster effect evaluation value corresponding to the initial preset clustering K value needs to be determined firstly. In the embodiment, an average Euclidean distance between a center of the pore diameter (also referred to as the central position of the pore diameter) of each pore region in each of the initial first clusters and each cluster center (also referred to as the central position of each of the initial first clusters) corresponding to the center of the pore diameter is calculated. Then an average value of the average Euclidean distances corresponding to all initial first clusters is calculated, the average value is taken as the intra-cluster effect evaluation value corresponding to the initial preset clustering K value, and the intra-cluster effect evaluation value is expressed as q in a formula. When pore regions are closer to a corresponding cluster center in each of the initial first clusters, the intra-cluster effect evaluation value will be better; that is to say, in terms of the distribution of pores in each of the initial first clusters, a clustering effect corresponding to the initial preset clustering K value is better.

Then, the inter-cluster effect evaluation value corresponding to the initial preset clustering K value needs to be determined. A Euclidean distance between cluster centers of any two initial first clusters is calculated based on the coordinate position of each cluster center in each of the initial first clusters, and an average value of Euclidean distances corresponding to cluster centers of all initial first clusters can be calculated. The average value of Euclidean distances is taken as the inter-cluster effect evaluation value corresponding to the initial preset clustering K value, and the inter-cluster effect evaluation value is expressed as w'. When a distance between the cluster centers of the initial first clusters is farther, the inter-cluster effect evaluation value will be better; that is to say, in terms of the distribution of each of the initial first clusters, a clustering effect corresponding to the initial preset cluster K value is better. It should be noted that calculation processes of Euclidean distance and average value is based on prior art and is not within the protection scope of the disclosure, and will not be described here in detail.

Step 5.1.1.3: determining a clustering effect evaluation index corresponding to the initial preset clustering K value based on the intra-cluster effect evaluation value and the inter-cluster effect evaluation value.

In the embodiment, the inter-cluster effect evaluation value q is negatively correlated with the clustering effect evaluation index; that is to say, when the inter-cluster effect evaluation value q is smaller, the clustering effect evaluation index will be larger. The intra-cluster effect evaluation value w' is positively correlated with the clustering effect evaluation index; that is to say, when the intra-cluster effect evaluation value w' is larger, the clustering effect evaluation index will be larger. Based on relevant knowledge of mathematical modeling and a numerical relationship among the inter-cluster effect evaluation value q, the intra-cluster effect evaluation value w', and the clustering effect evaluation index, the clustering effect evaluation index corresponding to the initial preset clustering K value can be calculated. A calculation formula for the clustering effect evaluation index is expressed as follows:

$$G = 1 - \exp\left(-\frac{w'}{q}\right)$$

where G represents the clustering effect evaluation index corresponding to the initial preset clustering K value, w' represents the intra-cluster effect evaluation value corresponding to the initial preset clustering K value, q represents the inter-cluster effect evaluation value corresponding to the initial preset clustering K value, and exp( ) represents an exponential function based on a natural constant.

In the calculation formula for the clustering effect evaluation index, in order to determine an optimal preset clustering K value, the clustering effect evaluation index G can be in a range of 0~1. When the intra-cluster effect evaluation value w' is larger and the inter-cluster effect evaluation value q is smaller, the clustering effect evaluation index G will be larger, and the clustering effect is better.

Step 5.1.2: when the clustering effect evaluation index corresponding to the initial preset clustering K value is not greater than a clustering effect threshold, updating the initial preset clustering K value to obtain an updated preset clustering K value and a clustering effect evaluation index corresponding to the updated preset clustering K value; when the clustering effect evaluation index corresponding to the updated preset clustering K value is still not greater than the clustering effect threshold, updating the updated preset clustering K value to obtain a subsequent preset clustering K value and a clustering effect evaluation index corresponding to the subsequent preset clustering K value until the clustering effect evaluation index corresponding to the subsequent preset clustering K value is greater than the clustering effect threshold; taking the subsequent preset clustering K value greater than the clustering effect threshold as the optimal preset clustering K value.

In the embodiment, the clustering effect evaluation index corresponding to the initial preset clustering K value is compared with the clustering effect threshold, and the clustering effect threshold can be 0.7. The clustering effect threshold can be set by the implementer based on specific situations. When the clustering effect evaluation index corresponding to the initial preset clustering K value is not greater than the clustering effect threshold, this indicates that the clustering effect of the initial preset clustering K value is not optimal and the initial clustering K value needs to be updated. The initial preset clustering K value is updated by adding 1 to obtain an updated preset clustering K value, and the updated preset clustering K value can be 2. Referring to the calculation process of the clustering effect evaluation index corresponding to the initial preset clustering K value, a clustering effect evaluation index corresponding to the updated preset clustering K value can be obtained based on the updated preset clustering K value and the pore diameter of each pore region of the section of the porous metal material. When the clustering effect evaluation index corresponding to the updated preset clustering K value is still not greater than the clustering effect threshold, this indicates that the clustering effect evaluation index corresponding to the updated preset clustering K value is not optimal and the updated preset clustering K value needs to be updated again, and the updated clustering K value is updated repeatedly to compare the clustering effect evaluation index corresponding to the updated clustering K value with the clustering effect threshold until the clustering effect evaluation index corresponding to the updated clustering K value is greater than the clustering effect threshold; and the a preset clustering K value corresponding to the clustering effect evaluation index greater than the cluster effect threshold is taken as the optimal preset clustering K value. In addition, when the clustering effect evaluation index corresponding to the initial preset clustering is greater than the clustering effect threshold, the initial preset clustering K value is taken as the optimal preset clustering K value.

So far, the embodiment has obtained the optimal preset clustering K value corresponding to the section of the porous metal material. Furthermore, in order to obtain a more suitable pore diameter distribution uniformity index, an optimal preset clustering K value is selected from multiple preset clustering K values to ensure that the pore diameter distribution uniformity index is obtained based on the optimal preset clustering K value, which improves accuracy of a second qualification index of the porous metal material obtained by calculating the pore diameter distribution uniformity index.

Step 5.2: obtaining second clusters based on the optimal preset clustering K value and a pore diameter of each pore region of the section of the porous metal material.

In the embodiment, the optimal preset clustering K value is used to cluster the pore diameter of each pore region of the section of the porous metal material by the K-means clustering algorithm, thereby obtaining multiple second pore diameter clusters. The multiple second pore diameter clusters are taken as the second clusters. So far, the second clusters are obtained in the embodiment.

Step 5.3: determining a pore diameter distribution uniformity index of each of the second clusters based on the number of pore diameters in each of the second clusters, a central position of each of the pore diameters in each of the second clusters, and a central position of the grayscale image.

Specifically, the step 5.3 includes step 5.3.1 and step 5.3.2.

Step 5.3.1: determining a Euclidean distance between a center of each pore diameter in each of the second clusters and a center of the grayscale image based on the central position of each of the pore diameters in each of the second clusters and the central position of the grayscale image.

In the embodiment, the Euclidean distance between the center of each pore diameter in each of the second clusters and the center of the grayscale image can be calculated based on a coordinate position of a center of each pore diameter of each of the second clusters and a coordinate position of a center of the grayscale image. The calculation process of the Euclidean distance belongs to the prior art and is not within the protection scope of the disclosure, and will not be described in detail here.

Step 5.3.2: determining an average Euclidean distance of each of second clusters based on the number of pore diameters in each of the second clusters and the Euclidean distance between the center of each pore diameter in each of the second clusters and the center of the grayscale image; and taking the average Euclidean distance as the pore diameter distribution uniformity index of a corresponding one of the second clusters.

In the embodiment, in order to facilitate calculating the second qualification index of the porous metal material, it is necessary to calculate a pore diameter distribution uniformity index corresponding to each of the second clusters. The pore diameter distribution uniformity index can be a distance between a center of each pore diameter in each of the second clusters to the center of the grayscale image, and the distance can indicate the distribution situation of each of the second clusters. A calculation formula for the pore diameter distribution uniformity index can be:

$$f = \frac{\sum_{x=1}^{n} d_x}{n}$$

where f represents the pore diameter distribution uniformity index corresponding to each of the second clusters, n represents the number of all pore diameters in each of the second clusters, x represents a sequence number of each pore diameter in each of the second clusters, and $d_x$ represents a Euclidean distance between a center of an x-th pore diameter and the center of the grayscale image.

Step 6: determining a second qualification index of the porous metal material based on the pore diameter distribution uniformity index of each of the second clusters; and determining a quality evaluation index of the porous metal material based on the first qualification index and the second qualification index. Specifically, the step 6 includes step 6.1 and step 6.2.

Step 6.1: determining a second qualification index of the porous metal material based on the pore diameter distribution uniformity index of each of the second clusters.

Specifically, the step 6.1 includes step 6.1.1 and step 6.1.2.

Step 6.1.1: calculating an absolute value of a difference value between pore diameter distribution uniformity indexes corresponding to any two second clusters based on the pore diameter distribution uniformity index of each of the second clusters.

In the embodiment, the calculation for the absolute value of the difference value between the pore diameter distribution uniformity indexes corresponding to any two second clusters is used to analyze a difference in distribution situations of the two second clusters. The difference can indicate distribution uniformity of each pore in the two second clusters in the section of the porous metal material.

Step 6.1.2: determining the second qualification index of the porous metal material based on the absolute value of the difference value between the pore diameter distribution uniformity indexes corresponding to any two second clusters.

It should be noted that in order to analyze a qualification situation of the porous metal material, the absolute value of the difference value between the pore diameter distribution uniformity indexes corresponding to any two second clusters is needed to determine the second qualification index of the porous metal material based on relevant knowledge of mathematical modelling. A calculation formula for the second qualification index is expressed as follows:

$$e = \exp\left(-\sum_{l=1}^{K}\sum_{j=1}^{K}|f_l - f_j|\right)$$

where e represents the second qualification index of the porous metal material, exp( ) represents an exponential function based on a natural constant, K represents the number of the second clusters, l and j are both sequence numbers of the second clusters, $f_l$ represents a pore diameter distribution uniformity index corresponding to a l-th second cluster, $f_j$ represents a pore diameter distribution uniformity index corresponding to the a j-th second cluster, and | | represents an absolute value function.

In the calculation formula for the second qualification index, the second qualification index e can be in a range of 0~1, and $$\sum_{l=1}^{K}\sum_{j=1}^{K}|f_l - f_j|)$$

represents a cumulative value of the absolute value of the difference value between the pore diameter distribution uniformity indexes corresponding to any two second clusters. The cumulative value is negatively correlated with the second qualification index of the porous metal material. When $$\sum_{i=1}^{K} \sum_{j=1}^{K} |f_i - f_j|$$

is larger, the second qualification index e is smaller, and the distribution uniformity of pores in the second clusters is worse.

Step 6.2: determining a quality evaluation index of the porous metal material based on the first qualification index and the second qualification index.

Specifically, in the step 6.2, a product of the first qualification index and the second qualification index is calculated as the quality evaluation index of the porous metal material.

In the embodiment, a calculation formula for the quality evaluation index of the porous metal material is expressed as follows:

$$J=Q*e$$

where J represents the quality evaluation index of the porous metal material, Q represents the first qualification index of the porous metal material, and e represents the second qualification index of the porous metal material.

Specifically, both the first qualification index and the second qualification index are in a range of 0~1. The quality evaluation index of the porous metal material is in a range of 0~1. The quality of the porous metal material is analyzed from two aspects including the uniformity of all pore sizes of the porous metal material (i.e., the first qualification index) and the distribution uniformity of all pores of the porous metal material (i.e., the second qualification index), which is beneficial to improve the accuracy of the quality evaluation index of the porous metal material.

Step 7: determining whether the porous metal material is qualified based on the quality evaluation index.

Specifically, in the step 7, the porous metal material is unqualified when the quality evaluation index is less than a preset quality evaluation threshold; and the porous metal material is qualified when the quality evaluation index is not less than the preset quality evaluation threshold.

The embodiment records the preset quality evaluation threshold as A, the preset quality evaluation threshold $\lambda$ is set to 0.7, and the preset quality evaluation threshold $\lambda$ can be set by the implementer based on quality evaluation requirement of the porous metal material. When the quality evaluation index of the porous metal material is less than the preset quality evaluation threshold of 0.7, it is determined that the porous metal material is unqualified. When the porous metal material is unqualified, it indicates that the porous metal material has defects with uniform pore sizes and distribution. Otherwise, it is determined that the quality of the porous metal material is qualified, the qualified quality indicates that the porous metal material does not exhibit defects such as uniform pore sizes and distribution.

So far, in the embodiment, by using image processing technology, related knowledge of shadow, and clustering technology, all pore sizes and the distribution uniformity of all pores of the section of the porous metal material are analyzed based on the image feature information of the section of the porous metal material. The disclosure achieves the quality detection of the porous metal material, and the reliability and accuracy of the quality detection result of the porous metal material are improved. By analyzing more accurate detection results provided by the disclosure and controlling production parameters, porous metal products with higher qualification rates can be obtained.

The above embodiments are only used to illustrate the technical solutions of the disclosure, not to limit them. Although the disclosure has been described in detail with reference to the above embodiments, those of ordinary skill in the art should understand that the technical solutions described in the above embodiments can still be modified, or some of the technical features of the above embodiments can be equivalently replaced. These modifications or replacements do not cause the essence of the corresponding technical solutions to deviate from the scope of the technical solutions of each embodiment of the disclosure, and should be included in the protection scope of the disclosure.

What is claimed is:

1. A quality detection method for porous metal material, comprising:

step 1: acquiring a sectional image of a porous metal material, and performing pre-processing on the sectional image to obtain a grayscale image;

step 2: obtaining pore regions of a section of the porous metal material based on the grayscale image, and obtaining a shadow region of each of the pore regions based on the pore regions;

step 3: acquiring a light source region of the porous metal material, and determining an area correction weight value of the shadow region of each of the pore regions based on a central position of each of the pore regions, a central position of the light source region, and a preset distance correction weight value of a light source distance;

step 4: clustering the pore regions of the section of the porous metal material to obtain first clusters; determining a first qualification index of the porous metal material based on the number of the first clusters, the number of pore regions in each of the first clusters, an area correction weight value of a shadow region of each of the pore regions in each of the first clusters, and an area of the shadow region of each of the pore regions in each of the first clusters; and the area of the shadow region being the number of all pixel points in the shadow region;

step 5: acquiring an optimal preset clustering K value, obtaining second clusters based on the optimal preset clustering K value and a pore diameter of each of the pore regions of the section of the porous metal material, and determining a pore diameter distribution uniformity index of each of the second clusters based on the number of pore diameters in each of the second clusters, a central position of each of the pore diameters in each of the second clusters, and a central position of the grayscale image;

step 6: determining a second qualification index of the porous metal material based on the pore diameter distribution uniformity index of each of the second clusters, and determining a quality evaluation index of the porous metal material based on the first qualification index and the second qualification index; and step 7: determining whether the porous metal material is qualified based on the quality evaluation index;

wherein a calculation formula for the first qualification index is:

$$Q = \exp\left(-\sum_{r=1}^{N} \frac{\sum_{i=1}^{m-1} |\omega_i * s_i - \omega_{i+1} * s_{i+1}|}{m-1}\right)$$

where Q represents the first qualification index of the porous metal material, N represents the number of the first clusters, r represents a sequence number of the first cluster, m represents the number of the pore regions in each of the first clusters, i represents a sequence number of the pore regions in each of the first clusters, $\omega_i$ represents an area correction weight value of a shadow region of an i-th pore region in each of the first clusters, $s_i$ represents an area of the shadow region of the i-th pore region in each of the first clusters, $w_{i+1}$ represents an area correction weight value of a shadow region of an i+1-th pore region in each of the first clusters, $s_{i+1}$ represents an area of the shadow region of the i+1-th pore region in each of the first clusters, exp( ) represents an exponential function based on a natural constant, and | | represents an absolute value function;

wherein the acquiring the optimal preset clustering K value comprises:

using an initial preset clustering K value to cluster the pore diameter of each of the pore regions of the section of the porous metal material, thereby obtaining initial first clusters; determining an intra-cluster effect evaluation value and an inter-cluster effect evaluation value corresponding to the initial preset clustering K value based on a central position of a pore diameter of each pore region in each of the initial first clusters and a central position of each of the initial first clusters; and determining a clustering effect evaluation index corresponding to the initial preset clustering K value based on the intra-cluster effect evaluation value and the inter-cluster effect evaluation value;

when the clustering effect evaluation index corresponding to the initial preset clustering K value is not greater than a clustering effect threshold, updating the initial preset clustering K value to obtain an updated preset clustering K value and a clustering effect evaluation index corresponding to the updated preset clustering K value; when the clustering effect evaluation index corresponding to the updated preset clustering K value is still not greater than the clustering effect threshold, repeatedly updating the updated preset clustering K value to obtain a subsequent preset clustering K value and a clustering effect evaluation index corresponding to the subsequent preset clustering K value until the clustering effect evaluation index corresponding to the subsequent preset clustering K value is greater than the clustering effect threshold; and taking the subsequent preset clustering K value greater than the clustering effect threshold as the optimal preset clustering K value.

2. The quality detection method for porous metal material as claimed in claim 1, wherein the obtaining pore regions of a section of the porous metal material based on the grayscale image comprises:

performing edge detection on the grayscale image to obtain an edge image, processing the edge image by using a Hough gradient method to obtain circular edges in the edge image, and taking a region within each of the circular edges as each of the pore regions in the section of the porous metal material.

3. The quality detection method for porous metal material as claimed in claim 1, wherein the obtaining a shadow region of each of the pore regions based on the pore regions comprises:

performing edge detection on each of the pore regions to obtain a shadow edge line of each of the pore regions, calculating average gray values corresponding to two regions divided by the shadow edge line, and using one of the two regions with a smaller average gray value as the shadow region of the pore region.

4. The quality detection method for porous metal material as claimed in claim 1, wherein the determining an area correction weight value of the shadow region of each of the pore regions based on a central position of each of the pore regions, a central position of the light source region, and a preset distance correction weight value of a light source distance comprises:

determining a Euclidean distance between the pore region and the light source region based on the central position of the pore region and the central position of the light source region, and using the Euclidean distance as the light source distance between the pore region and the light source region; and determining the area correction weight value of the shadow region based on the preset distance correction weight value of the light source distance and the light source distance between the pore region and the light source region, wherein a calculation formula for the area correction weight value of the shadow region is expressed as follows:

$$\omega = p * \exp(-d)$$

where $\omega$ represents the area correction weight value of the shadow region, p represents the preset distance correction weight value of the light source distance, d represents the light source between the pore region and the light source distance, and exp( ) represents an exponential function based on a natural constant.

5. The quality detection method for porous metal material as claimed in claim 1, wherein the determining a pore diameter distribution uniformity index of each of the second clusters based on the number of pore diameters in each of the second clusters, a central position of each of the pore diameters in each of the second clusters, and a central position of the grayscale image comprises:

determining a Euclidean distance between a center of each pore diameter in each of the second clusters and a center of the grayscale image based on the central position of each of the pore diameters in each of the second clusters and the central position of the grayscale image; and determining an average Euclidean distance of each of the second clusters based on the number of pore diameters in each of the second clusters and the Euclidean distance between the center of each pore diameter in each of the second clusters and the center of the grayscale image; and taking the average Euclidean distance as the pore diameter distribution uniformity index of a corresponding one of the second clusters.

6. The quality detection method for porous metal material as claimed in claim 1, wherein the determining a second qualification index of the porous metal material based on the pore diameter distribution uniformity index of each of the second clusters comprises:

calculating an absolute value of a difference value between pore diameter distribution uniformity indexes corresponding to any two second clusters based on the pore diameter distribution uniformity index of each of the second clusters;

determining the second qualification index of the porous metal material based on the absolute value of the difference value between the pore diameter distribution uniformity indexes corresponding to any two second clusters, wherein a calculation formula for the second qualification index is expressed as follows:

$$e = \exp\left(-\sum_{l=1}^{K}\sum_{j=1}^{K}|f_l - f_j|\right)$$

where e represents the second qualification index of the porous metal material, exp( ) represents an exponential function based on a natural constant, K represents the number of the second clusters, l and j are both sequence numbers of the second clusters, $f_l$ represents a pore diameter distribution uniformity index corresponding to an l-th second cluster, $f_j$ represents a pore diameter distribution uniformity index corresponding to a j-th second cluster, and | | represents the absolute value function.

7. The quality detection method for porous metal material as claimed in claim 1, wherein the determining a quality evaluation index of the porous metal material based on the first qualification index and the second qualification index comprises:

calculating a product of the first qualification index and the second qualification index, and taking the product as the quality evaluation index of the porous metal material.

8. The quality detection method for porous metal material as claimed in claim 1, wherein the determining whether the porous metal material is qualified based on the quality evaluation index comprises:

determining that the porous metal material is unqualified when the quality evaluation index is less than a preset quality evaluation threshold; and determining that the porous metal material is qualified when the quality evaluation index is not less than the preset quality evaluation threshold.

* * * * *